May 1, 1962 C. F. WHITE 3,032,710
FEEDBACK SYSTEM TESTING APPARATUS
Filed July 11, 1958 4 Sheets-Sheet 3
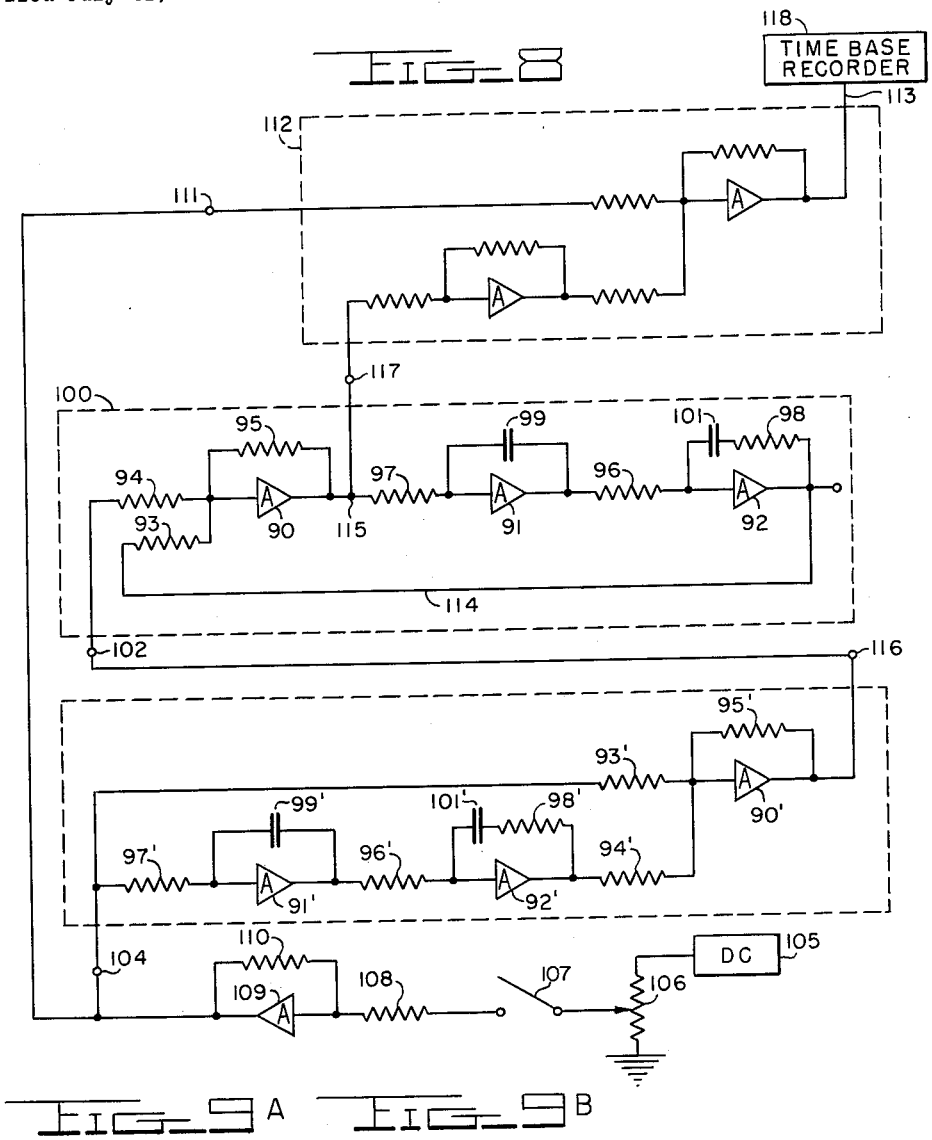
FIG_8
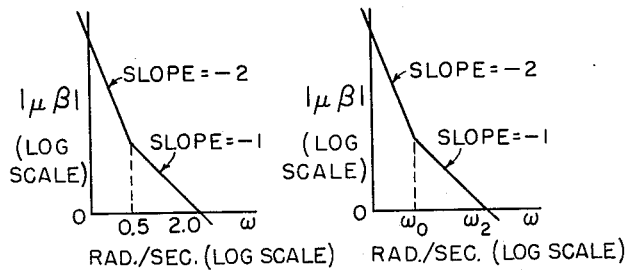
FIG_9A  FIG_9B
INVENTOR
CHARLES F. WHITE
BY Richard C. Reed
ATTORNEYS May 1, 1962 C. F. WHITE 3,032,710
FEEDBACK SYSTEM TESTING APPARATUS
Filed July 11, 1958 4 Sheets-Sheet 4

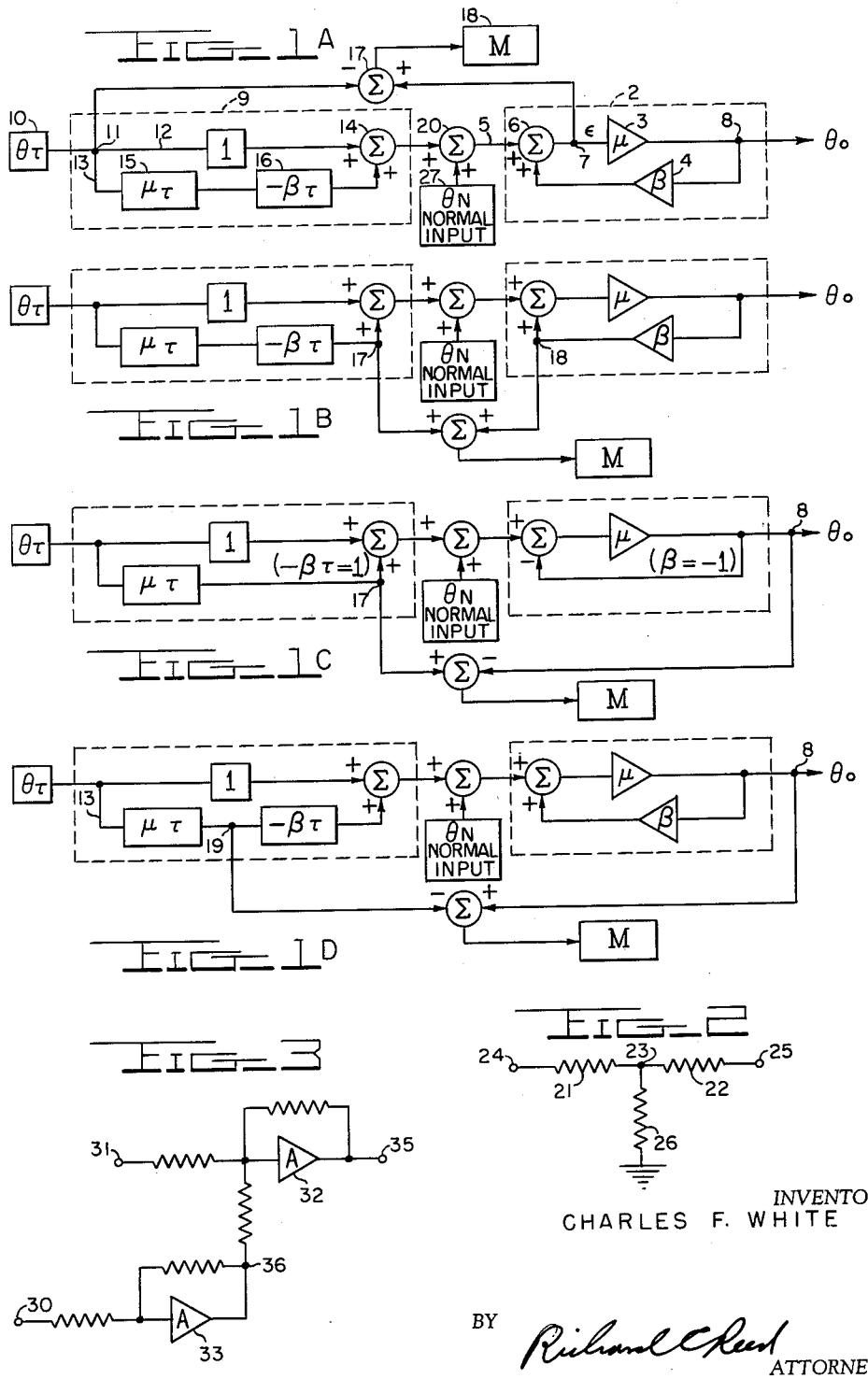

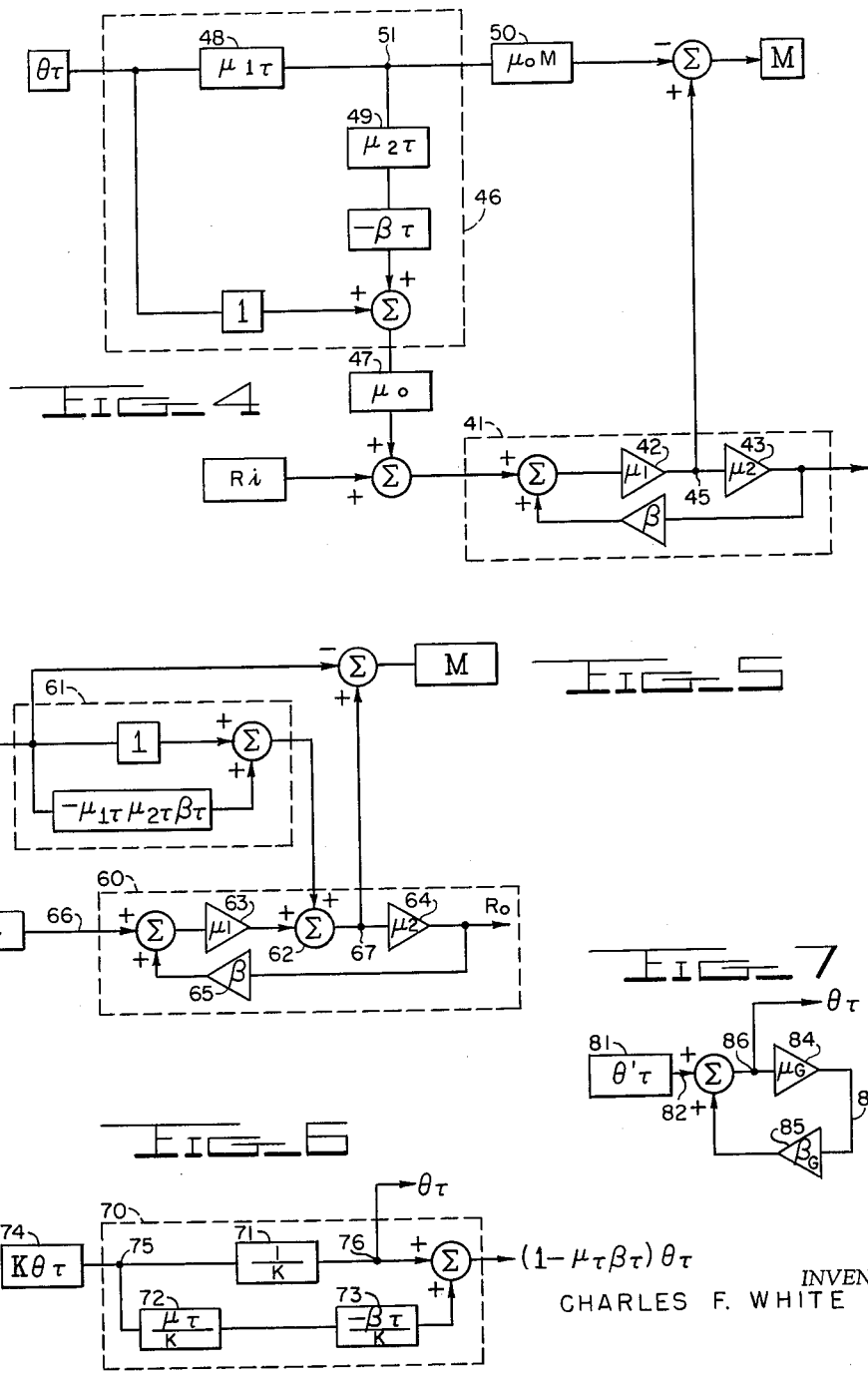

INVENTOR
CHARLES F. WHITE
BY *Richard C. Reed*
ATTORNEYS

United States Patent Office 3,032,710
Patented May 1, 1962

3,032,710
FEEDBACK SYSTEM TESTING APPARATUS
Charles F. White, Oxon Hill, Md.
Filed July 11, 1958, Ser. No. 748,098
13 Claims. (Cl. 324—57)
(Granted under Title 35, U.S. Code (1952), sec. 266)

The invention described herein may be manufactured and used by or for the Government of the United States of America for governmental purposes without the payment of any royalties thereon or therefor.

The present invention relates to a method of and apparatus for testing a feedback system designed as an error-closing closed-cycle system hereafter referred to as a servo-system, which yields information normally obtained by open feedback loop tests, yet does not involve opening the loop and in some cases does not involve removing the system from service.

In general a servo-system is a control device which produces an output control signal dependent upon an input or command signal, and contains a self-correcting or feedback loop arrangement from the output to the input. A detailed analysis may be found in R. E. Graham, "Linear Servo Theory," Bell System Technical Journal, 1946, or L. A. MacColl, Fundamental Theory of Servomechanisms, D. Van Nostrand Company, Inc., 1945. The signals may be electromagnetic, mechanical, hydraulic, pneumatic, etc., or any of these used in combination.

The number of servo-systems used both for military and industrial applications has increased rapidly in recent years. Some military uses are, for example, automatic radar range tracking systems, automatic angle tracking systems, regulated power supplies, and automatic pilots. Industrial uses of servo-systems include automatic processing systems and product packaging control systems.

Since the components of most servo-systems are subject to variation due to errors in manufacture, wear, damage, or maladjustment, it is customary to test such equipment as it is produced and periodically thereafter. In high performance systems, the usual closed-loop input and output measurements ordinarily are not satisfactory, because wide variations in the components of a system causing important deviations in performance generally are difficult to detect in closed-loop overall performance measurement. For this reason and because system design is ordinarily accomplished using the open-loop transfer function, it is desirable to obtain an open loop transfer function, which heretofore has necessitated opening the feedback path of the servo loop.

There are, however, several reasons why it is generally difficult or not feasible to make open loop tests. In some cases the system must be sealed or so located that the loop is inaccessible. In other situations, as for example, steam turbine regulators, the system is unstable until the loop is closed. In still other cases, as for example, chemical process control, an inferior product is produced during the period when the loop is open. In these and many other cases closed-loop testing is either mandatory or highly desirable.

One object of the present invention is therefore, to provide a method and apparatus for determining the open-loop transfer function by tests of a closed loop servo-system.

Another object of the present invention is to provide a method and apparatus, with functions as set forth above, and which requires access only to the input and output of the servo-system during performance of the test.

Another object of the present invention is to provide a method and apparatus with functions as set forth above, wherein the input signal applied to the servo-system may be given a predetermined form without comprising the test result.

Another object of the invention is to provide a method and apparatus, with functions as set forth above, wherein a minimum number of active elements is required.

Another object of the invention is to provide a method and apparatus, with functions as set forth above, wherein the required test signal is less complex than the signal which normally operates the system.

Another object of the invention is to provide a method and apparatus, with functions as set forth above, wherein the servo-system may be tested while in operation.

Another object of the invention is to provide a method and apparatus, with functions as set forth above, wherein the components of a servo-system may be compared with different, but functionally equivalent, components in a test apparatus.

These and other objects will be better understood from the following specification and drawings in which like numerals in various figures indicate like elements.

In the drawings:

FIG. 1(a) shows one embodiment of the invention employing the servo-system error signal in the monitoring arrangement;

FIG. 1(b) shows a second embodiment of the test apparatus employing the servo-system feedback signal in the monitoring arrangement;

FIG. 1(c) shows a third embodiment of the test apparatus employing a monitor arrangement suitable for a certain class of servo-systems;

FIG. 1(d) shows a fourth preferred embodiment of the test apparatus employing the servo-system input and output signals;

FIG. 2 is a detailed embodiment of a summing point known as a signal "adder";

FIG. 3 is a detailed embodiment of a difference-taking summing point known as an "error detector";

FIG. 4 is a fifth embodiment of the test apparatus for use with servo-systems having a complex input signal;

FIG. 5 is a sixth embodiment of the test apparatus for a certain class of servo-systems, which can be substituted for the test apparatus of FIG. 4;

FIG. 6 is an alternate embodiment of a portion of the test apparatus;

FIG. 7 is an embodiment of a test signal source for use with the apparatus in testing a certain class of servo-systems;

FIG. 8 is a servo-system and a test apparatus of the invention produced using standard analog computer techniques;

Figure 10:
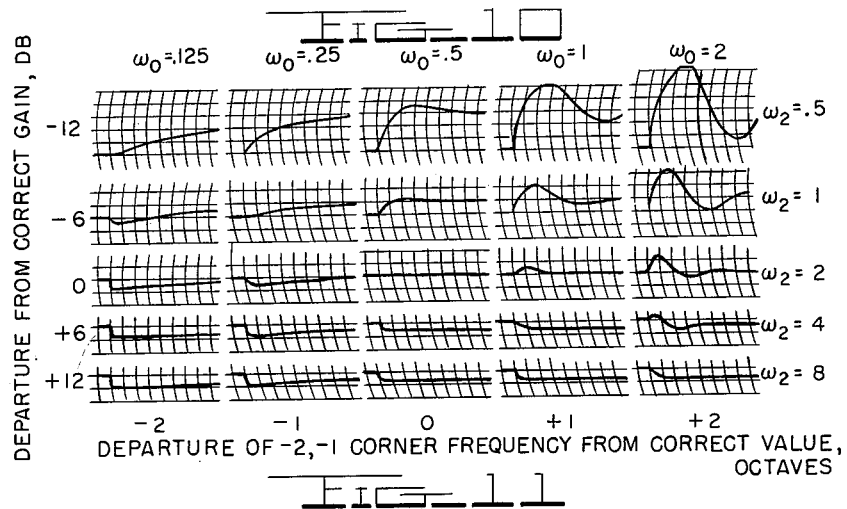
Figure 11:
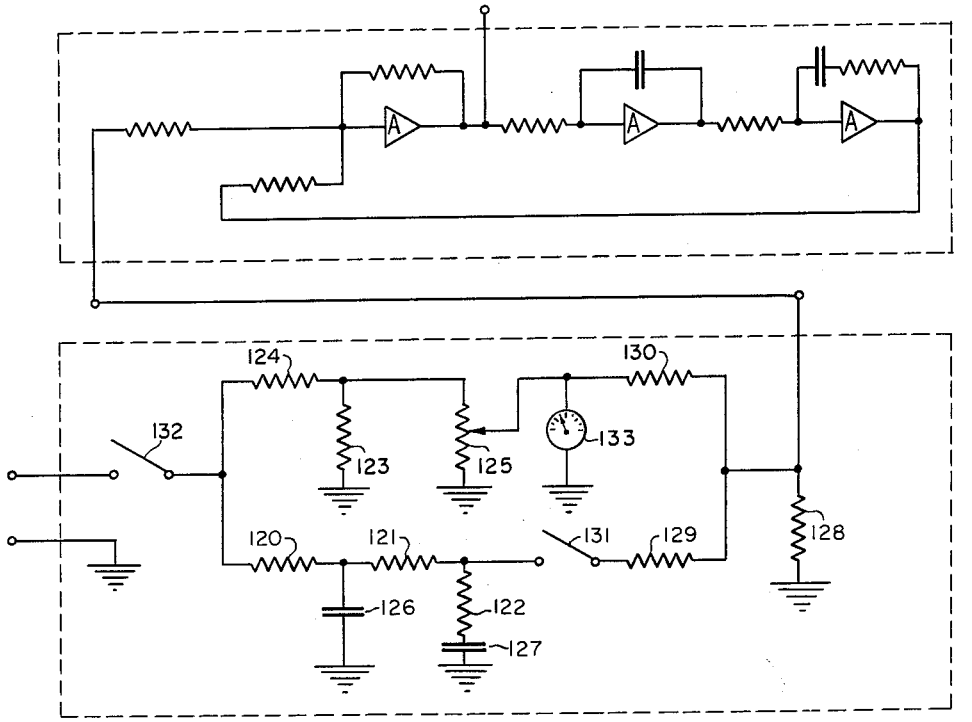

FIGS. 9(a) and 9(b) show asymptotic segment representations of the loop transfer functions of the test apparatus and the servo-system, respectively, in FIG. 8;

FIG. 10 is a matrix of test results produced by the test apparatus of FIG. 8 for various servo-system gain and corner frequency departures from specifications;

FIG. 11 is a test apparatus and servo-system of the type shown in FIG. 8 wherein the test apparatus is constructed with passive network elements.

The subject matter pertaining to FIG. 6 is included herein to provide a better understanding of the invention, but any rights thereto in the present disclosure have been disclaimed.

This subject matter has been incorporated in a co-pending patent application Serial No. 837,563, filed by Laurence F. Gilchrist, who was originally listed as a coinventor in the present case. Briefly, this invention resides in methods and apparatus for generating a servo-system test signal and various methods and apparatus for test monitoring, which in proper combination, provide the open loop transfer function of a servo-system without physically opening the loop during test. This invention in addition provides methods and apparatus for generating a test signal for application to certain classes of servo-systems while in service and monitoring the result without disturbing the normal operation of the system.

Referring specifically to FIG. 1(a) there is shown a block diagram of a conventional servo-system 2 having a forward path 3 with an output over input transfer ratio $\mu$ and a feedback path 4 with a transfer ratio or function $\beta$. A signal applied to the input 5 is combined with the signal from the feedback path 4 by the summing point 6 to produce an error signal $\epsilon$ at point 7. Signal $\epsilon$ has a value equal to the input signal multiplied by $$\frac{1}{1-\mu\beta}$$

The output signal $\theta$ at point 8 is $$\frac{\mu}{1-\mu\beta}$$

times the input signal.

In order to measure the open-loop transfer function, $\mu\beta$, of such a system, it has been necessary to open the loop at some point. Opening the loop, however, is not always possible, either because of physical limitations or because the system will not operate satisfactorily. There is, therefore, a need for a testing method which will yield the information gained from an open loop test without opening the loop.

In the present invention a multiplier means is connected to a source of test signal to multiply the test signal by $1-\mu_T\beta_T$, where $\mu_T$ and $\beta_T$ are designed to equal $\mu$ and $\beta$, respectively, and the resultant signal applied to the servo-system input. The error signal should, therefore, be equal to the test signal, producing the same error signal conditions obtaining had the test signal been applied directly to the open loop system. The multiplier means may contain calibrated devices for varying $\mu_T$ and $\beta_T$ to measure the value of $\mu$ and $\beta$ when the test method is employed as an analyzer, but alternately, $\mu_T$ and $\beta_T$ will be used as standards while adjusting $\mu$ and $\beta$ until the error signal $\epsilon$ corresponds to the test signal $\theta_T$ (within acceptable go—no-go limits).

One arrangement 9 for performing this multiplication is shown in FIG. 1(a). The test signal $\theta_T$ from source 10 is applied to the junction 11. From junction 11 the test signal is passed through two paths 12 and 13 to a summing point 14. The path 12 may be a direct connection allowing the test signal to pass unaltered to the summing point 14 and is, therefore, designated by a unity transfer function. The path 13 contains multiplier means 15 for multiplying the signal by the transfer function $\mu_T$ followed by a multiplier means 16 for further multiplying the signal by the transfer function $-\beta_T$. The net effect in path 13 is to produce, at the summing point 14, a signal $-\mu_T\beta_T$. While FIG. 1(a) shows two separate means for multiplying $\theta_T$ by $\mu_T$ and $-\beta_T$, the required structure is merely a means for multiplying $\theta_T$ by the product $\mu_T\beta_T$ and the drawing could have shown a single means for this function.

FIG. 2 shows one embodiment of a summing point 14 of FIG. 1(a) when the outputs of paths 12 and 13 are electrical signals. Two resistors 21 and 22 of substantially equal value are connected at one end to form a junction 23, the ends 24 and 25 are connected to output ends of paths 12 and 13, respectively. A much smaller resistor 26 having a value, for example, one-thousandth that of resistor 21 has one end connected to the junction 23 and its opposite end connected to a common return. The output ends of paths 12 and 13 are thus effectively isolated and a combined output may be extracted between junction 23 and the common return. The circuit of FIG. 2 is an "adder" type summing point, since it combines the signals in phase. Similar results are obtained by applying the signal from each path to a different grid of a mixer tube. Mechanical systems, on the other hand, may require a differential planetary gear arrangement. Other equivalent arrangements will be obvious to those skilled in the art.

The signal from the output of summing point 14 in FIG. 1(a) is applied to one input of another "adder" type summing point 20 serially connected between the normal input command signal source 27 and the input 5 of the servo-system. The purpose of this second summing point is to isolate the test signal source and normal input signal source, thereby permitting a system test during quiescent periods of $\theta_T$, i.e., periods when $\theta_n$ is essentially zero.

To monitor the results of the test, the error signal in the servo-system is compared directly with the signal from the test source. The test source signal waveform is completely arbitrary. If the test signal source waveform is repeatable to close tolerances as in the case of a simple step function, for example, observation of the error signal, per se, may be sufficient. For a more complicated signal from a less stable source it will be preferable to display the difference between the servo-system error signal and the test signal $\theta_T$, provided by a monitor to be described. As will be evident later, the feedback or the output signal may be used in a similar monitor.

A monitor for use with an unspecified test signal is provided by bridging a "subtracter" type summing point 17 between a first monitor point 7 in the servo-system and a second monitor point 11 in the multiplying arrangement 9. The output of the subtracter summing point is fed to indicating means 18. The function of the subtracter summing point is to derive a signal equal to the difference between the signals from the first and second monitor points.

A typical form of a subtracter summing point or error detector for an electrical servo-system is shown in FIG. 3. Points 7 and 11 of FIG. 1(a) are connected to points 30 and 31, respectively, of FIG. 3. Amplifiers 32 and 33 may be D.C. operational amplifiers of the type described in A. S. Locke, "Guidance," D. Van Nostrand Company, Inc., 1955, chapter 19. The resistors are all of equal value and may conveniently be of the order of one megohm. Each amplifier has an odd number of phase-inverting stages to produce in combination with its input and feedback resistors a gain essentially equal to $-1$. Thus it can be seen that the signal at point 30 is multiplied by $-1$ before it reaches point 36. The signals at point 31 and point 36 are each multiplied by $-1$ and thus the signal at point 35 is the difference between the signals at point 30 and at point 31, respectviely. Numerous other means are well known to those skilled in the art for performing the function of the subtracter summing point. Again in mechanical systems differential gears, etc., may be used depending on the nature of the signals to be combined.

The signal applied to the indicating means 18 in FIG. 1(a) is equal to the test source signal $\theta_T$ multiplied by the ratio of the sum of the quantities $-\mu_T\beta_T$ and $\mu\beta$ divided by the quantity $(1-\mu\beta)$. In all embodiments, described herein, of the means for developing a signal to be observed by the indicating means, the type of summing point and the order of connection in the case of "subtracter" summing points is chosen to give results consistent with the above equation. If the values of the $\mu$ and $\beta$ transfer functions of the servo-system agree with the specification values $\mu_T$ and $\beta_T$, there will be zero output from the monitor. If a difference in these functions exists, the magnitude and polarity of the monitor output as a function of time will indicate the type and degree of difference. In studies of a particular type of servo-system, the waveform of the monitor output signal may be used in interpreting differences in gain and frequency response existing between the functions $-\mu_T\beta_T$ and $\mu\beta$.

It would be futile to attempt to illustrate all of the combinations of elements which are covered by the $\mu$, $\beta$, $\mu_T$ and $\beta_T$ portions of the systems shown in the drawings. The $\mu$ portions could contain vacuum tube amplifiers, signal controlled motors, or complicated hydraulic systems, to mention a few of the possibilities. The $\beta$ portions may consist of direct electrical wire connections or a complicated system of active and/or passive elements. The $\mu_T$ and $-\beta_T$ portions may be physically exact duplicates of the $\mu$ and $\beta$ portions (except for a polarity inversion of $\beta$) or they may be analogs. The $-\beta_T$ in the multiplier arrangement is a positive transfer function since the servo-system $\beta$ is always basically negative. The means for producing $-\beta_T$, therefore, does not require a phase inverter. Means may be inserted in the monitor circuit, if necessary, for converting mechanical signals to electrical form, for example, or the reverse, according to principles well known in the art. The source 10 may supply any signal function, although, for purposes of illustration, the sources shown herein will generally be step-function generators. The indicator 18 may be a direct reading meter or some form of recording means, for example, a time base voltage recorder.

In most servo-systems it will be desirable to avoid the use of point 7 as a monitor point, because the signal is generally weak at this point and any loading may affect the amplitude of the error signal and alter the response of the system.

An alternate arrangement is shown in FIG. 1(b) where the first and second monitor points 17 and 18, respectively, are located in the feedback and $-\mu_T\beta_T$ loops where the signal strength is relatively high.

In special cases where $\beta = -1$ the first monitor point may be located at the output 8 of the servo-system and the second monitor point at point 17 as in FIG. 1(c). This arrangement requires access to only the input and output terminals of the servo-system, but is restricted to $\beta = -1$ systems.

An arrangement requiring access to only the servo-system input and output terminals with no restriction on $\beta$ is shown in FIG. 1(d), where the first monitor point 8 is located at the servo-system output and the second monitor point is located between the $\mu_T$ and $-\beta_T$ portions of path 13. This particular monitoring arrangement permits determination of the correspondence between $\mu$ and $\mu_T$ and between $\beta$ and $\beta_T$, as differentiated from the previously described monitoring arrangements, which provide a comparison of the loop gain product $\mu\beta$ and the product $\mu_T\beta_T$.

In practice, it is highly desirable to have available and make use of the extensive development of D.C. analog computers in the construction of the multiplying arrangement 9. In addition, the monitoring means readily available is frequently a varying D.C. indicator. Only in special instances, however, are the servo-system signals transmitted as varying D.C. throughout the servo loop. Thus, in general, when D.C. test signals are employed, auxiliary transducers are required in coupling between the multiplying arrangement and the servo-system being tested. One example of this is an automatic frequency control system.

Application of the present invention to an automatic frequency control system is shown in FIG. 4. The auxiliary transducer in this case is a test oscillator 47 the frequency of which varies with the amplitude of the D.C. test signal from arrangement 46. The signal thus obtained corresponds to a normal input signal $R_1$, which is a frequency modulated carrier wave. The system 41 is shown with the forward transfer function split into two portions 42 and 43 having transfer ratios $\mu_1$ and $\mu_2$, respectively. The portion 42 includes a frequency discriminator, and the first monitor point 45 is located at the output of this discriminator where the signal variations are essentially varying D.C. The multiplier arrangement 46 and monitor structure are designed in the manner previously described in FIG. 1(a), for example. Since $\beta = -1$ in this particular servo-system, the minus $\beta_T$ function of the multiplier equals unity and no structure is needed to supply this function.

An additional portion 50, having a transfer function $\mu_{om}$ corresponding to the effect due to the introduction of the oscillator 47, is added to the test apparatus as a compensatory expedient. The value of $\mu_{om}$ is determined by a preliminary experimental measurement and is set numerically equal to the product $\mu_0\mu_1$ divided by $\mu_1$, thus the value of $\mu_{1T}$ and $\mu_{2T}$ become numerically equal to $\mu_1$ and $\mu_2$, respectively. The portions 48, 49 and 50 are not duplicates of the portions 42, 43 and 47, but are based on D.C. analog functions. The analogs of portions 42, 43 and 47 are easily constructed by one skilled in the analog computer art using the preliminary measurements of these components.

Since the signal at monitor point 45 is the error signal $\theta_T$ multiplied by the function $\mu_1$, a similar monitor point in the multiplier arrangement 46 is located at point 51. By passing the signal from this point through the portion 50 which compensates for the oscillator characteristic, a signal is obtained which is compared to the signal from monitor point 45 to determine whether $\mu_1$ and $\mu_2$ conform to specification.

In cases where the servo-system under test has loop signal transmission as a varying D.C. voltage at some point in the loop, the arrangement of FIG. 5 may be used to avoid the auxiliary transducers shown in FIG. 4. The test signal is inserted by means of an "adder" type summing point 62 inserted in the forward path of servo-system 60 before the monitor point 67. As in FIG. 4 the portions 63, 64 and 65 are represented by their D.C. analogs in the multiplier arrangement 61. In FIG. 5, the input 66 may be any of a wide variety of signal types, e.g., pulse time position, shaft mechanical position, modulated carrier electrical signal, etc. The application of the test monitoring method shown in FIG. 5 requires varying D.C. signal transmission at only one point 67 in the loop. This varying D.C. signal point may be in the feedback path or in the forward path as shown in FIG. 5. During test periods, the normal servo input 66 is assumed quiescent as discussed previously. Test amplitude in this case must be carefully chosen to avoid servo-system non-linearity during the test period.

A basic requirement of servo-systems is that the forward path must have a source of power which is controlled by the input signal. At the output of the forward path the signal level is greatly amplified in the absence of a feedback path. The net gain from input to output with the feedback loop closed is essentially unity over the useful frequency range. Feedback paths seldom include amplification sources. In analoging the open-loop transfer function, therefore, at least one portion of the multiplier arrangement in the test apparatus must have gain, i.e., a transfer function greater than unity. It would appear, however, that if the test source were capable of supplying a signal of sufficient amplitude, the multiplier arrangement gain requirement could be eliminated and the multiplier arrangement could be formed from passive elements only. An approach to this idea is shown in FIG. 6.

FIG. 6 shows an alternate embodiment of a multiplier arrangement 70 and test signal source 74, as used with any of the systems heretofore described, wherein the multiplier arrangement is composed entirely of passive elements. In specific cases, portions 72 and 73 of FIG. 6 must be combined and the monitoring method of FIG. 1(d) will not be practical, as in the case of a tachometer generator in the feedback path. The gain requirements of each of the elements 71—73 in the multiplier arrangement has been reduced by a factor K, an approximation to the highest gain encountered in any of the elements of the multiplier. This produces an overall reduction of gain which can be offset by using a test signal which is greater by a factor of K. The largest gain found in servo-systems is ordinarily near zero frequency and in some cases approaches a theoretically infinite value. Analysis of the system under test, however, will yield a practical value to which K may be limited. In monitoring with this arrangement it must be noted that the signal at monitor point 75 has a different value than the arrangements employing active elements. Thus when arrangements of the type shown in FIG. 4 are substituted for those in FIG. 1(a) the point 76 is used in place of point 75 for a second monitor point.

A test signal source which may be employed in the test apparatus is shown in FIG. 7. This source has special utility in testing certain types of servo-systems which are to remain in service while under test. In this instance the test signal must be of such a form that it does not interfere with the signals already present in the system. For example, the chemical process control there are servos which are subjected to transients similar to step functions when a batch of chemical is suddenly introduced. These transients must be coped with during the normal operation of the system. If the servo-system test input signal is of exactly the same form as the normal input transients, testing may be allowed. Use of the means shown in FIG. 7 permits performance of the test with open-loop transfer function determination within the system input limitation separately prescribed.

In FIG. 7 there is shown a test signal source which will, in combination with the previously described multiplier arrangements, reproduce at the servo-system input the waveform of a signal from a preselected source. The test source comprises the preselected source 81 of signals $\theta'_T$ having the characteristics desired for the servo-system test input signal connected to the input 82 of a loop 83 containing portions 84 and 85 having transfer ratios $\mu_G$ and $\beta_G$ which are duplicates or analogs of the forward and feedback paths in the servo-system under test. A signal in the loop which is equivalent to the error signal of the servo-system under test is extracted at point 86 and applied to the input of any of the multiplier arrangements of the invention. The signal at point 86 is $$\frac{\theta'_T}{1-\mu_G\beta_G}$$

and replaces the signal $\theta_T$ in the previously disclosed embodiments. After passing through the $1-\mu_T\beta_T$ multiplier the signal again becomes $\theta'_T$ at the input of the servo under test provided $\mu_G\beta_G$ is exactly equal to, $\mu_T\beta_T$. Thus the choice of $\theta'_T$ generator 81 determines the form of the input signal to the servo-system under test.

FIG. 8 shows a servo-system 100, having a transfer function typical of a radar range tracking system, constructed on a standard analog computer. The transfer functions $\mu_T$ and $\beta_T$ of FIG. 8 were designed to conform to the asymptotic segment combination, shown in FIG. 9 (a), with a corner frequency of 0.5 radians per second. FIG. 9(b) is a generalized asymptotic representation of the servo-system of FIG. 8. To obtain actual values of $\omega_0$ and $\omega_2$, the scales shown in FIG. 9(a) must be placed so that the actual corner frequency of the servo-system coincides with $\omega_0$ and the indicated gain at this frequency coincides with gain produced by the system. The analog of these functions was constructed according to standard analog computer techniques.

Amplifiers 90, 91 and 92 in FIG. 8 are operational amplifiers in the analog computer. In this particular embodiment resistors 93, 94, 95 and 96 are one megohm resistors; resistor 97 has a value of 0.5 megohm and resistor 98 has a value of 2 megohm. Capacitors 99 and 101 have a value of 1 microfarad. Passive elements 94'—99' and 101' also have values equal to their counterparts 94—99 and 101 in the servo-system. The test monitor summing point 112 comprises two operational amplifiers interconnected in the manner indicated in FIG. 3. The test signal source comprises a source of D.C. voltage 105 applied across a voltage divider 106 through a one megohm resistor 108 to operational amplifier 109. Switch 107 is used to key the D.C. voltage input and provide a step function test signal. A 0.1 megohm resistor 110 is used to provide a negative feedback for amplifier 109 and in combination with input resistor 108 provides a gain of 0.1.

Amplifiers 91 and 92 form the forward path or $\mu$ portion of the servo-system. The feedback is a direct connection 114 from output to input. The test signal from amplifier 109 is applied to the input 104 of the multiplier arrangement and one input terminal 111 of the monitor summing point. The output 116 of the multiplier arrangement is applied to the input 102 of the servo-system. The error signal from point 115 in the servo-system is connected to the remaining input terminal 117 of the monitor summing point 112. The output of the monitor summing point 113 is then fed to a time base recorder 118.

FIG. 10 shows a matrix of time base recordings taken at the output of the monitor in FIG. 8. At the center of the matrix is shown the steady or null output which indicates that the transfer functions of the servo-system have their specification or correct values. The recordings above and below the center were made after altering the elements of the servo-system to produce departures from the correct gain, as indicated, and the recordings to the left and right of center were made after altering the elements to produce departures from the correct corner frequency, as indicated. This is accomplished by placing the scales from FIG. 9(a) on FIG. 9(b), as previously indicated, and determining the new values of the elements in accordance with the same standard analog computer technique. Note that the polarities of the test monitor output signal are opposite for high and low gain, and that the same is true for departures from the correct corner frequency when the gain is corrected.

FIG. 11 shows the same servo-system with a test signal generator of the type previously described in FIG. 6 containing only passive elements. An analysis of this system indicates that a D.C. gain of 1000 is a sufficient approximation of the theoretical infinite gain indicated in FIG. 9a. The values of the various components shown are as follows; resistor 120 is 0.320 megohm, resistor 121 is 0.300 megohm, resistor 122 is 0.020 megohm, resistors 123, 124 and 125 are any large value, for example, one megohm, and capacitors 126 and 127 are 100 microfarads. The relative value of the summing resistor 128 as compared to the isolating resistors 129 and 130 was chosen to give the desired error voltage step from the available D.C. voltage appearing across voltage monitor 133. The power supply of the analog computer provides a source of 300 v. D.C. to produce a required error step voltage of 0.1 v. in this case. Thus the value of K defined in the discussion of FIG. 6 could have been as high as 3000 for the specific system of FIG. 8.

Switch 131 is used to open the circuit during the adjustment of the voltage across meter 133 by means of potentiometer 125 in the unity function path. Switch 132 is used to produce the test signal. Note the double integrator using capacitors 126 and 127, which is similar to those in FIG. 8 using amplifiers 91 and 92. The test results obtained with this circuit did not differ noticeably from those shown in FIG. 10.

As is evident from the test data in FIG. 10, the present method employs simple time domain test signals as employed in transient testing and yet supplies information in the frequency domain, the latter being used extensively in the design of servo-systems. Data concerning the open-loop transfer function has been obtained in the past by open-loop frequency response tests which were tedious and time consuming, due to the extremely low frequencies involved and instrumentation difficulties, as well as inaccurate due to the erratic response (balance drifts, etc.) of some systems in the open-loop condition. The duration of a single test set forth in the present specification need not exceed 5 to 10 system time constants (reciprocal radian bandwidths).

As has been shown, the method and apparatus set forth herein can be adapted to any type system, and requires a minimum amout of structure in their application. The testing apparatus can be built into the servo-systems, if desired, to permit periodic or continuous checking in the field. No unusual access to the system under test is required, and the system may be tested in some cases even while it is in normal service. Persons having limited technical skill, supplied with comparative data, can easily run go—no-go tests on complicated systems for quality control. In some cases the components of one servo-system can be used to generate a test signal for testing a similar system by combining these components in the manner described herein.

Other applications and embodiments of the principles and structure defined herein will be readily devised by those skilled in the art, and the present invention is therefore to be limited only by the appended claims.

What is claimed is:

1. A test apparatus for a servo-system wherein the system has a first input summing point and an output, a forward path connected between said first input summing point and said output having an input over output transfer function $\mu$, a feedback path connecting said output to said input summing point having a transfer function $\beta$, and a first monitor point located in one of said paths from which a first monitor signal can be sampled, said test apparatus comprising; a test signal source, a multiplier means for multiplying said test signal by $1-\mu_T\beta_T$, where $\mu_T$ and $\beta_T$ are substantially equal to $\mu$ and $\beta$, respectively, said multiplier including an input, an output and at least one path therethrough having a second monitor point from which a second monitor signal can be sampled, monitor means for comparing the amplitude of said first monitor signal with the amplitude of said second monitor signal, a first means connecting the input of said multiplier means to said test signal source, a first signal coupling means interconnecting the output of said multiplier means and said first input summing point, whereby a system signal is induced in said servo-system at said first monitor point which corresponds to a monitor test signal in said multiplier at said second monitor point, said monitor means being coupled to said first monitor point, and a coupling path interconnecting said monitor means and said second monitor point, said coupling path having the same transfer function as said first signal coupling means whereby the open loop transfer function of the servo system may be evaluated without opening the feedback loop.

2. The apparatus according to claim 1 wherein said test signal source comprises, a second servo-system having a forward path with a transfer function $\mu_G$ and a feedback path with a transfer function $\beta_G$, where $\mu_G$ and $\beta_G$ are equal to $\mu_T$ and $\beta_T$, respectively, the input of said multiplier means being connected to the forward path of said second servo-system.

3. The apparatus according to claim 1 wherein said second monitor point is located at the input of said multiplier means.

4. The apparatus according to claim 1 wherein the multiplier means comprises a first and a second path, each having an input and an output, said first path containing means for multiplying any signal therein by a factor $\mu_T\beta_T$, said test signal source being connected to the input of each path, and a second summing point for combining the signals in said first and second paths connected to the output of each of said paths.

5. The apparatus according to claim 4 wherein the second monitor point is located at the output end of said first path.

6. The apparatus according to claim 4 wherein said first path comprises two serially connected portions, a first of said portions having a transfer ratio of $\mu_T$ and a second of said portions having a transfer ratio of $\beta_T$.

7. The apparatus according to claim 6 wherein said second monitor point is located between said first and second portions.

8. Combined servo-system and test apparatus comprising; a servo-system including a first input summing point to which a source of input test signal is connected and an output, a forward path connecting said input summing point to said output characterized by a transfer function $\mu$, a feedback path connecting said output to said input summing point characterized by a transfer function $\beta$, a first monitor point located in one of said forward and feedback paths, multiplier means connected between said source and said input summing point for multiplying input signals applied thereto by $1-\mu_T\beta_T$, where $\mu_T$ and $\beta_T$ are substantially equal to $\mu$ and $\beta$, whereby a system signal is induced at said first monitor point which corresponds to a monitor test signal in said multiplier means at a second monitor point, and monitor means connected to said first monitor point for comparing the system signal induced at said first monitor point by said test signal with said monitor test signal similarly induced in said multiplier means, whereby the open loop transfer function of the servo-system may be evaluated without opening the feedback loop.

9. A test apparatus according to claim 8 wherein said first monitor point is located in said forward path adjacent to said first summing point.

10. A test apparatus according to claim 8 wherein said first monitor point is located in said feedback path adjacent said first summing point.

11. A test apparatus according to claim 8 wherein said first monitor point is located at the output of said servo-system.

12. A test apparatus for a servo-system, wherein said servo-system has a source of modulated carrier waves connected at the input thereof and a detector therein for deriving a varying D.C. signal from said modulated carrier, comprising; a test signal source, D.C. analog means connected to said source for multiplying the output of said source by $1-\mu_T\beta_T$, where $\mu_T\beta_T$ is substantially equal to the open loop transfer function of the servo-system, an oscillator having the same frequency as said carrier, said oscillator having a D.C. input for modulating said oscillator, means connecting the output of said D.C. analog means to said D.C. input, means connecting the output of said oscillator to the input of said servo-system, whereby a system signal is induced in said servo-system at the detector output which corresponds to a monitor test signal induced in said D.C. analog means and monitor means connected to the output of said detector for comparing the amplitude of a signal from said detector with the amplitude of a signal in said D.C. analog means, whereby the open loop transfer function of the servo-system may be evaluated without opening the feedback loop.

13. A test apparatus for a servo-system, wherein the servo-system includes at least one component therein which has an output providing a varying D.C. signal; comprising a source of test signal, D.C. analog means for multiplying said test signal by $1-\mu_T\beta_T$ connected to said source, where $\mu_T\beta_T$ is substantially equal to the open loop transfer function of the servo-system, a summing point having at least two inputs and an output interposed in the servo-system with a first of said inputs connected to the output of said component, the output of said D.C. analog means being connected to a second input of said summing point, whereby a system signal is induced in said servo-system corresponding to a monitor test signal induced in said D.C. analog means, and monitor means connected to the output of said summing point for comparing the amplitude of signals from said summing point with the amplitude of a signal in said D.C. analog means, whereby the open loop transfer function of the servo-system may be evaluated without opening the feedback loop.

(References on following page)

References Cited in the file of this patent

UNITED STATES PATENTS

| | | |
|---|---|---|
| 2,694,794 | Blomqvist et al. | Nov. 16, 1954 |
| 2,747,162 | Attura | May 22, 1956 |
| 2,909,620 | Graef | Oct. 20, 1959 |

OTHER REFERENCES

Liu et al.: "Extending Transducer Transient Response by Electronic Compensation for High-Speed Physical Measurements," Review of Scientific Instruments, vol. 29, No. 1, January, 1958; pages 14–22.